H. F. FONTANELLA.
PLANCHETTE DEVICE.
APPLICATION FILED MAY 19, 1913.
1,091,206. Patented Mar. 24, 1914.
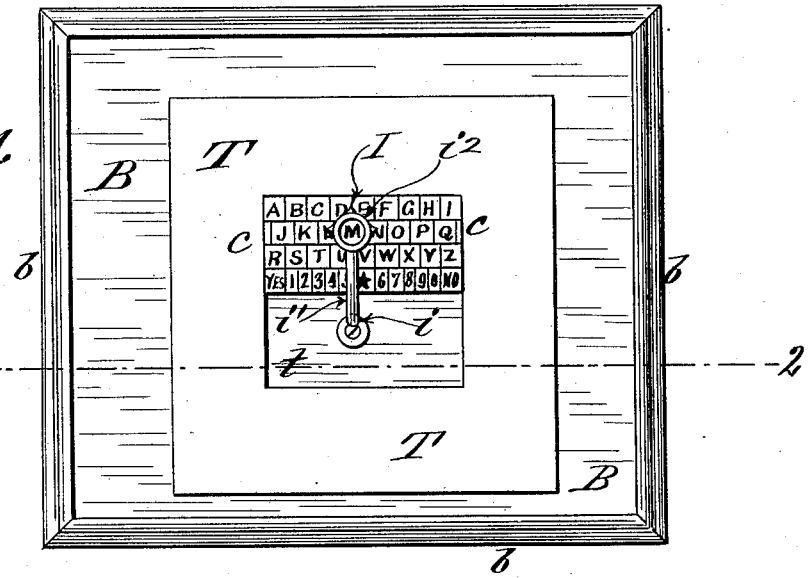
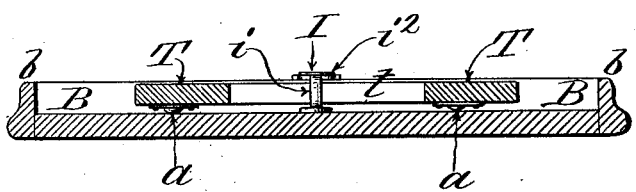
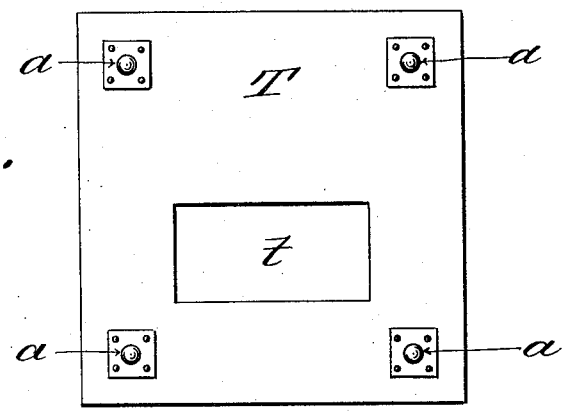
Inventor:
Henry F. Fontanella

UNITED STATES PATENT OFFICE.

HENRY F. FONTANELLA, OF NEW YORK, N. Y.

PLANCHETTE DEVICE.

1,091,206.  Specification of Letters Patent.  Patented Mar. 24, 1914.

Application filed May 19, 1913. Serial No. 768,411.

*To all whom it may concern:*

Be it known that I, HENRY F. FONTANELLA, a subject of the King of Italy, and a resident of the borough of Manhattan, city, county, and State of New York, have invented certain new and useful Improvements in Planchette Devices, of which the following is a specification.

My improvements relate to the class of devices of the "planchette" type in which a movable table or finger rest is presumably controlled by the dominant idea or will of the user or users. Originally as in the planchette these devices were made to indicate by means of a pencil or the like forming one of the supports of the finger table; next alphabetical and other characters were imposed on a stationary board over which the finger table, carrying an indicator, traveled; then the motion of the finger table was pivotally circumscribed with relation to concentrically arranged characters; and still later the characters and a pivoted indicator were arranged on the finger table itself, the indicator being actuated by a pin on the stationary support below. There are practical objections to all these forms. In the first two mentioned the finger table is free to roam indefinitely and lacks precision; in the third the motion of the finger table is necessarily semicircular and difficult; while in the last the finger table is restricted to a reciprocatory motion in a prescribed line and lacks freedom and delicacy of response to the touch.

It is the object of my invention to obviate these difficulties, and while restricting the motion of the finger table within due bounds, to allow it to move freely in any and all directions, so that it is sensitive and responsive to the slightest influence. Hence my invention consists in the specific construction and arrangement of parts described and claimed, a distinctive feature being the use of a stationary indicator in conjunction with letters and characters on the movable finger table definitely arranged with relation to the position of the fixed indicator as hereinafter more fully set forth.

In the accompanying drawings, Figure 1 is a plan of my improved device; Fig. 2 a transverse section upon plane of line 2—2 Fig. 1; Fig. 3 a view of the under side of the finger table; and Fig. 4 a sectional detail.

B is the base or supporting board upon which the finger table T rests and moves. The base board B is preferably formed with a circumscribing flange $b$, which limits the area of travel of the finger table T, and affords a finish to the edges of the rectangular tray thus formed.

Attached to the under side of the finger table or rest T, are anti-friction devices $a$, $a$, for contacting with the upper surface of the base board B. These anti-friction devices may be of any desired or well known character, and while I prefer the use of anti-friction balls as shown, any mechanical expedient may be substituted therefor without departing from the spirit and intent of my invention in this respect,—the object being to reduce frictional contact to the minimum and render the finger table T as sensitive as possible to the touch and influence of the user or users.

Supported rigidly upon the base board B is an indicator I, consisting of a standard $i$, and lateral extension $i'$, the latter preferably formed with a sight opening $i^2$ through which any one of the characters $c$, may be read when the finger table is brought into proper position with relation thereto. The lateral extension $i^1$, is equal in length to the width of the area occupied by the ideographic characters $c$, and the recess $t$, in the finger table T, is equal to said area, so that each character may be brought into coincidence with the sight or reading opening $i^2$. The characters $c$, may be imposed upon the upper surface of the finger table T in any desired or suitable manner.

Either the raised rim $b$, of the base board B, may be utilized to limit the area of travel of the finger table T, or the inner edges of the recess $t$, may be utilized for the same purpose, acting in conjunction with the standard $i$, as may be found most expedient, or both methods may be employed as would be the case in the construction and proportion of parts shown in Fig. 1, of the drawings.

While I do not confine myself to the identical relative arrangement of characters $c$ shown in Fig. 1, of the drawings, I find the same to be most desirable in that it is concentrated and compact, occupying the least possible area, and hence requiring a minimum of motion or travel on the part of the finger table T, so that the device is rendered more sensitive and responsive in operation and better and quicker results are attained. These features of concentration and freedom of table motion in any and all directions are important factors in my device, which is furthermore simple and cheap in construction.

What I claim as my invention and desire to secure by Letters Patent, is,

1. A planchette device of the class designated, comprising a base board, an indicator rigidly mounted thereon, a finger table movably resting on said base board and having said characters imposed upon its upper surface, and means for restricting the area of motion of said finger table on the base board to correspond to the area occupied by the ideographic characters as related to the stationary indicator, for the purpose described.

2. A planchette device of the class designated comprising a base board, an indicator rigidly mounted thereon, a movable finger table the under side of which is formed with anti-friction means contacting with the upper surface of the base board and the upper surface of which has imposed upon it said characters, and means for restricting the area of motion of said finger table on the base board to correspond to the area occupied by the ideographic characters as related to the stationary indicator for the purpose described.

HENRY F. FONTANELLA.

Witnesses:
GEO. WM. MIATT,
DOROTHY L. MIATT.

Copies of this patent may be obtained for five cents each, by addressing the "Commissioner of Patents, Washington, D. C."